United States Patent
Arch

(10) Patent No.: US 6,988,639 B2
(45) Date of Patent: Jan. 24, 2006

(54) BOTTOM DRAINING TANK WITH DISPOSABLE LINER AND METHOD

(75) Inventor: James J. Arch, Berkley, IL (US)

(73) Assignee: Scholle Corporation, Irvine, CA (US)

( * ) Notice: Subject to any disclaimer, the term of this patent is extended or adjusted under 35 U.S.C. 154(b) by 0 days.

(21) Appl. No.: 10/165,469

(22) Filed: Jun. 7, 2002

(65) Prior Publication Data

US 2003/0011194 A1   Jan. 16, 2003

Related U.S. Application Data

(62) Division of application No. 09/619,559, filed on Jul. 19, 2000, now abandoned.

(60) Provisional application No. 60/145,429, filed on Jul. 23, 1999.

(51) Int. Cl.
*B65D 35/56* (2006.01)

(52) U.S. Cl. .................... 222/105; 222/185.1; 222/529

(58) Field of Classification Search ................ 222/105, 222/185.1, 527, 529, 562
See application file for complete search history.

(56) References Cited

U.S. PATENT DOCUMENTS

| | | | | | |
|---|---|---|---|---|---|
| 2,831,610 A | * | 4/1958 | Dennie | ....................... | 222/105 |
| 5,067,636 A | * | 11/1991 | Pfeiffer et al. | .............. | 222/105 |
| 5,072,857 A | * | 12/1991 | Coleman | ..................... | 222/94 |
| 5,163,485 A | * | 11/1992 | Hermann | ..................... | 141/10 |
| 5,613,622 A | * | 3/1997 | Surrena et al. | ............ | 222/105 |
| 5,931,349 A | * | 8/1999 | Yoo | ........................ | 222/146.5 |
| 5,934,345 A | * | 8/1999 | Moynihan et al. | .......... | 141/313 |

* cited by examiner

*Primary Examiner*—Joseph A. Kaufman
(74) *Attorney, Agent, or Firm*—Watson IP Group, PLC; Jovan N. Jovanovic

(57) ABSTRACT

The portable tank defines a chamber within which is disposed a liner having a sealing interface with a tank discharge assembly. The features of the sealing interface of the liner with the discharge assembly and this discharge assembly itself virtually eliminate any risk that contents of the tank will seep or flow into the space outside of the liner and between the liner and the inner walls of the tank. The method of installing and using the liner system are also disclosed.

46 Claims, 7 Drawing Sheets

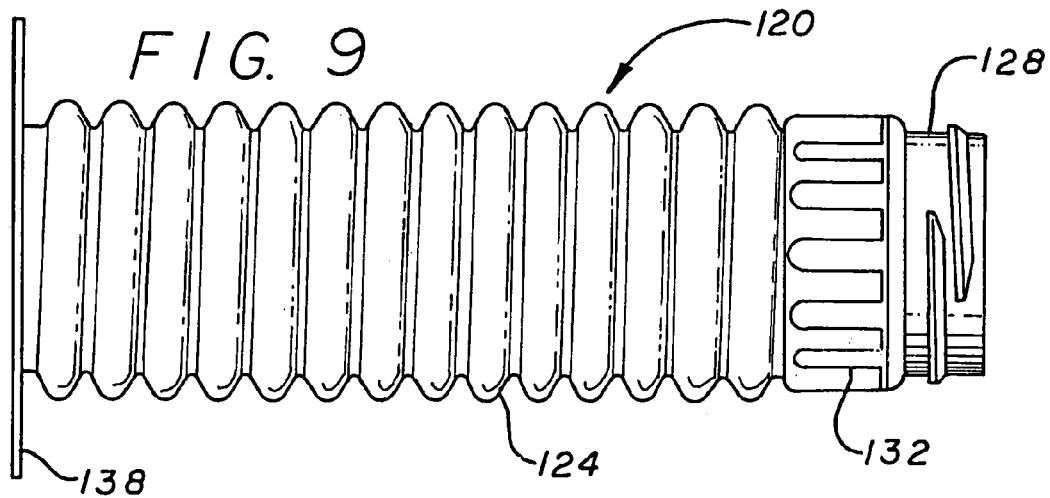
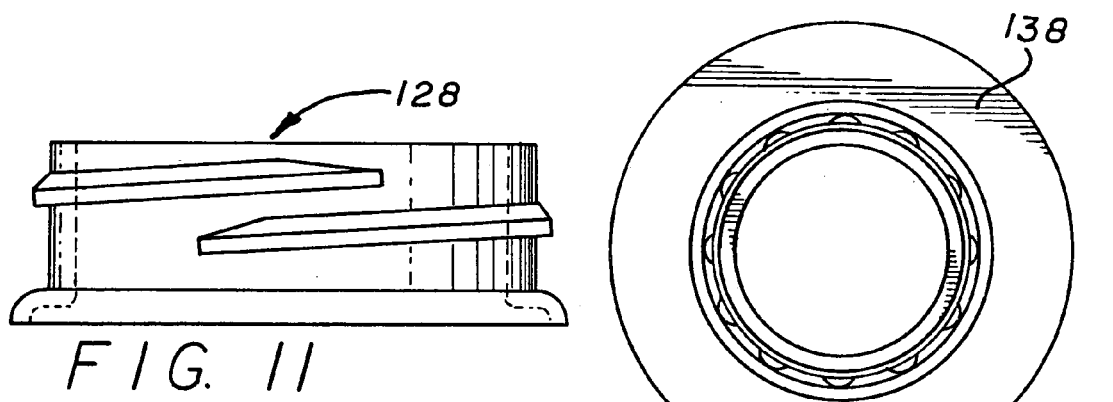
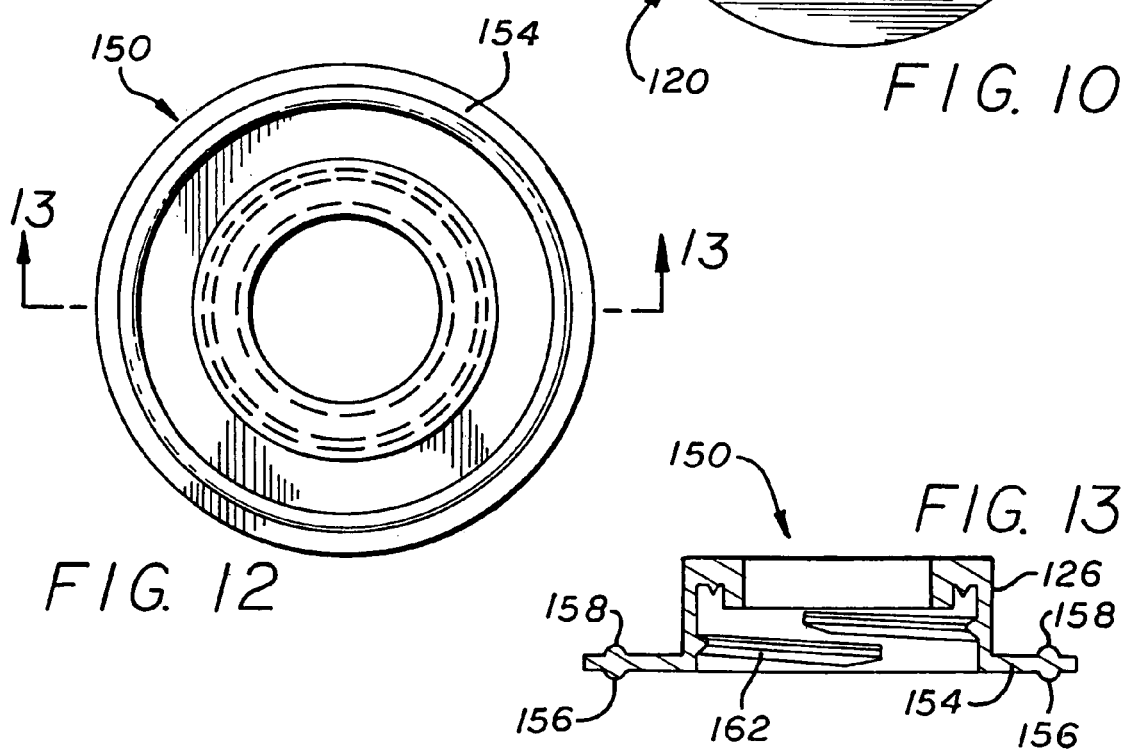

BOTTOM DRAINING TANK WITH DISPOSABLE LINER AND METHOD

CROSS REFERENCE TO RELATION APPLICATION

This application is a divisional of and claims the filing date benefit of U.S. patent application Ser. No. 09/619,559, filed Jul. 19, 2000 Now abandoned, which claims the filing date benefit of U.S. Provisional Application No. 60/145,429, filed Jul. 23, 1999, and whose entire contents are hereby incorporated by reference.

This is based on and claims the filing date benefit of copending provisional application Ser. No. 60/145,424, filed Jul. 23, 1999, and whose entire contents are hereby incorporated by reference.

BACKGROUND OF THE INVENTION

This invention relates to methods and apparatuses for containing bulk flowable materials for transportation, storage, loading and unloading; it further relates to product discharge assemblies used with such apparatuses. Examples of such materials are chemicals and paints, which, present a significant cleaning challenge when the tank or container is to be reused, and which also may present environmental concerns. The tank or container generally takes the form of a durable outer shape-retaining portion and having an inner flexible and disposable liner. After transportation and/or storage, the flowable materials are emptied from the container, and the durable portion of the container is reused. The disposable liner of the container is removed from the durable portion and is properly disposed of. The container is then prepared for the receipt of a new liner and reuse of the container.

It is known to make containers in which a liner sealingly connects at a discharge tube or fitting of the liner with a discharge conduit of the container by forcing of the discharge tube or fitting into a frictional or tapered sealing engagement with a discharge conduit of the container body. This prior system, however, presents a risk that seepage may occur between the discharge tube or fitting of the liner and the discharge conduit of the container body. Also, it presents a risk that the discharge tube or fitting of the liner may become dislodged from sealing engagement with the discharge conduit of the container body. In each case, a mere frictional or interference radial fit of the liner discharge tube or fitting into a surrounding discharge conduit of the container body is relied upon to effect sealing of the liner to the container body. However, this tenuous seal is located below the level of liquid or semi-liquid contents of the package, so that a loss of sealing integrity causes a flow of at least part of the package contents into the space between the liner and container body.

SUMMARY OF THE INVENTION

Directed to remedying the problems in the prior art, disclosed herein is a tank and liner combination, the tank has shape-retaining walls defining a tank chamber and a discharge opening from this tank chamber. The liner has flexible walls which define a liner chamber that substantially fills the tank chamber, and a discharge assembly is sealingly attached to the tank at the discharge opening and defines a discharge passage. The liner includes a (corrugated flexible) tube member extending in the discharge passage, and a gasket portion extends radially of the discharge passage to define a pair of opposite axially disposed sides. The gasket portion sealingly engages on one of the opposite axially disposed sides with the discharge assembly and sealingly engages on the other of the opposite sides with a member closing or securing the discharge passage.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 9 is a side elevational view of a preferred flanged flexible spout of the present invention (and is essentially an alternative for the liner fitting and the tube member combination of FIG. 4a);

FIG. 10 is an end elevational view of the spout of FIG. 9;

FIG. 11 is an enlarged side elevational view of the neck portion of the spout of FIG. 9;

FIG. 12 is an end view of a preferred gasket assembly (or o-ring free flange seal) of the present invention and usable with the spout of FIG. 9; and FIG. 13 is a cross-sectional view taken on line 13—13 of FIG. 12.

DETAILED DESCRIPTION OF PREFERRED EMBODIMENTS OF THE INVENTION

Figure 1:
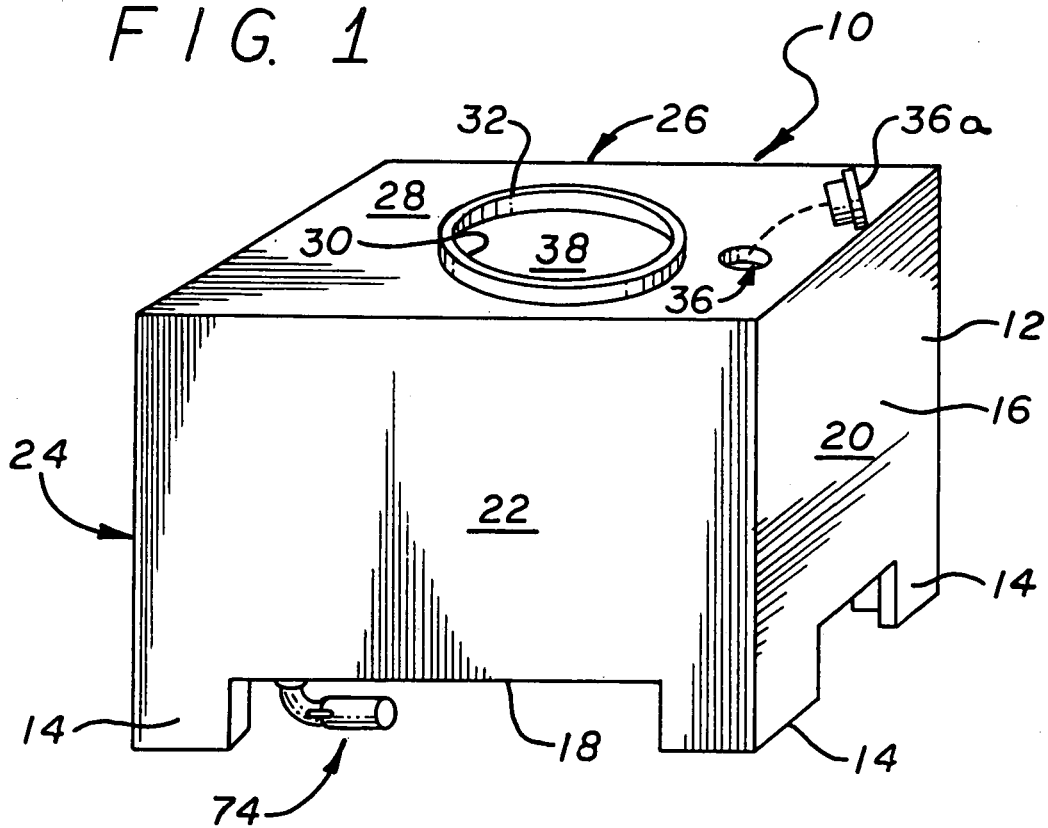
FIG. 1 is a perspective view of a container embodying the present invention.

Referring now to the drawings, an embodiment of a container 10 according to the present invention is illustrated. Outwardly, this container 10 has the form of a metallic rectangular or prismatic tank 12 with one of four feet 14 disposed at each corner of the tank. Examples of usable tanks are those manufactured by Hoover Materials Handling of Alpharetta, Ga., Clawson Container Company of Clarkston, Mich., and Custom Metal Craft of Springfield, Mo. The tank 12 has a container body, generally indicated with the numeral 16, which includes a floor wall 18 (best seen in FIG. 2), four side walls 20, 22, 24 and 26, and a top wall 28. The top wall 28 defines a comparatively large (twenty-two inches in diameter, for example) opening 30. The opening 30 is surrounded by an upstanding lip 32 extending upwardly from the top wall 28. A lid 34 (best seen in FIG. 2) is engageable with the top wall at opening 30 to close this opening, and the lid 34 may be removable secured to the top wall 28 by use of a band clamp engaging on the lip 32. Adjacent to but spaced somewhat from the opening 30, the top wall 28 defines a vent opening (indicated by arrowed numeral 36), and closed by a vent plug 36a. The walls 18–28 cooperatively define a chamber 38 within the container 10, and to which the opening 30 gives access. As will be seen, the vent opening 36 also gives access to the chamber 38, but in a different sense than that provided by opening 30.

Figure 2:
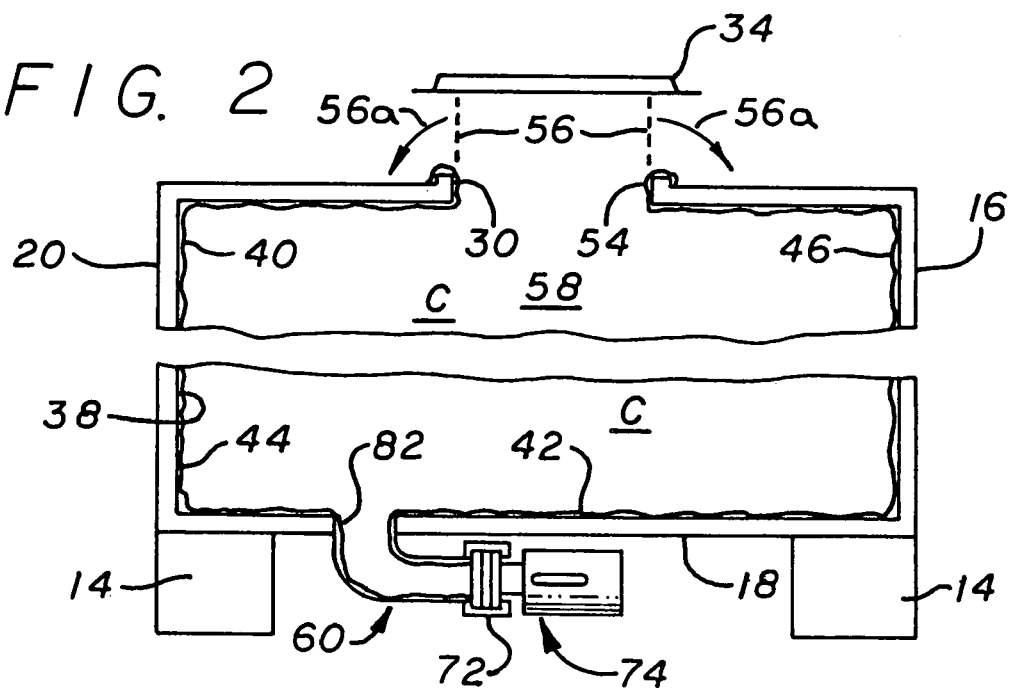
FIG. 2 is a fragmentary cross-sectional view of the container of FIG. 1.

FIG. 2 illustrates that the container 10 also includes within the chamber 30 a flexible liner 40. The flexible liner can be formed of LLDPE having a two to four mils thickness and formed to define a 220–500 gallon bag. This flexible liner 40 may be fabricated of sheet plastic material, and has walls corresponding to the walls 18–28 of the tank 12 (numbered 42–52 on FIG. 2). Like the tank 12, the liner 40 defines an opening 54, which is sized and positioned to be congruent with the opening 30. The liner 40 includes an upstanding cylindrical extension 56, one position of which is indicated by dashed lines in FIG. 2. As is indicated by the arrows 56a of FIG. 2, during installation of the line 40 into tank 12, the extension 56 of the liner 40 is brought upwardly through the opening 30 of the tank 12, and then is stretched about the lip 32 and turned downwardly over this lip. Thus, the extension 56 of liner 40 sealingly engages the tank 12 about the opening 30. Further, the opening 54 of the liner 40 gives access to the chamber 58 defined within the liner 40, and which effectively fills all of the chamber 38.

The liner 40 effectively fills all of the chamber 38 because after the liner 40 is sealingly engaged with the opening 30 of the tank 12 and also at the bottom, a partial vacuum is introduced via the vent opening 36. This partial vacuum is trapped between the tank 12 and liner 40 by installation of the vent plug 36a, while minimizing the back flow of ambient air into the space between the tank and liner. Thus, the walls 42–52 are drawn by this partial vacuum outwardly to engage the inside surfaces of the walls 18–28. In this way, the chamber 58 is expanded by the exterior partial vacuum trapped between the walls 18–28 and the walls 42–52 so that it is essentially the same size as and completely fills the chamber 38.

Further to the above, it is seen in FIGS. 1 and 2 that the tank 12 includes a bottom discharge assembly 60. This discharge assembly 60 includes a nipple 62 jointed to the floor wall 16 at an opening 64 of this wall, and an elbow 66 which threadably engages the nipple 62. The elbow 66 defines a curved passage 68, and terminates in a tapered, radially outwardly extending flange 70 with an opening 70a. Secured to the flange 70 by means of a multi-part band clamp 72 is a discharge control valve 74. In this case, the valve 74 is of ball valve type, although the invention is not so limited. The body 74a of the valve 74 includes a conduit section 74b terminating in a radially outwardly-extending tapered flange 74c. The band clamp 72 engages both of the flanges 74 and 74c to hold the valve 74 to the elbow 66.

Received into the nipple 62, and into the elbow 66, respectively, are a fitting 76 (which is scalingly attached to and forms a part of the liner 40), and a corrugated flexible and extensible tube member 78. Viewing FIG. 4a in particular, it is seen that the fitting 76 includes a flange portion 80 which is sealingly united with the floor wall 42 of the liner at an opening 82 in this floor (the opening 82 being best seen in FIG. 2). Below the flange 82, the fitting 76 includes one or more radially outwardly-extending flanges 84a, 84b, and 84c (three flanges in this case, although the invention is not so limited). These flanges 84a–c are utilized during manufacturing of the liner 40 to hold the fitting 76 during bonding or heat sealing, for example, of this fitting 76 to the floor wall 42 of the liner 40. Subsequently, during installation of the liner 40 into the tank 12, the fitting 76 is pushed downwardly into the nipple 62. Further, it is seen that the fitting 76 has an outwardly disposed thread section 86, upon which the tube member 78 is threadably and sealingly received at a thread section 88 of this tube member.

Figure 4A:
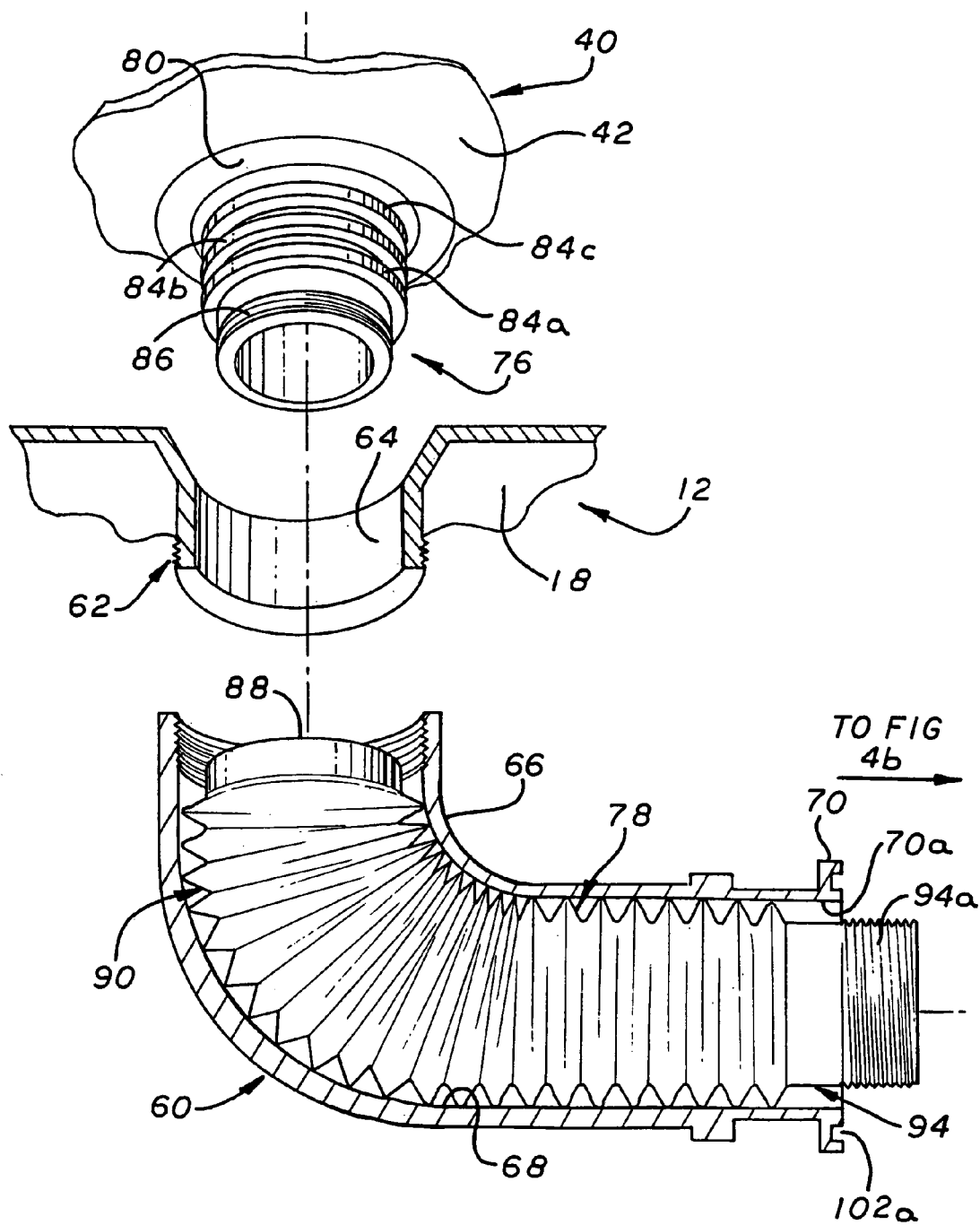
FIGS. 4a and 4b are exploded perspective views of components of the container body and of the container liner seen in FIGS. 1–3, and with parts of this container shown in a larger size for clarity of illustration.

Turning attention now to the tube member 78 in greater detail, it is seen that the tube member includes a corrugated flexible and extensible (and contractible as well) section 90. The tube member 78 is attached to the fitting 76 before this fitting is inserted into the nipple 62 during installation of the liner 40 into tank 12. The corrugated section 90 is sufficiently flexible that it will "snake" along the elbow 66 and conform to the passage 68 and extend substantially to or slightly beyond the opening 70a at the flange 70. At this time in the installation of the liner 40 into tank 12, the valve 74 is not attached to the flange 70 so that the tube member 78 is free to extend beyond the opening 70a. In the event that the tube member 78 contracts somewhat as a result of being pushed along passage 68 and does not protrude beyond opening 70a (as is illustrated in FIG. 4a), the tube member may be optionally provided with a cap member 92 including a loop handle or bail 92a. This loop handle 92a may be manually grasped so that an end termination portion 94 of the tube member 78 is protruded beyond the opening 70a of elbow 66, as is seen in FIG. 4a. The cap member 92 is then removed from the end termination portion 94 of the tube member 78.

Figure 4B:
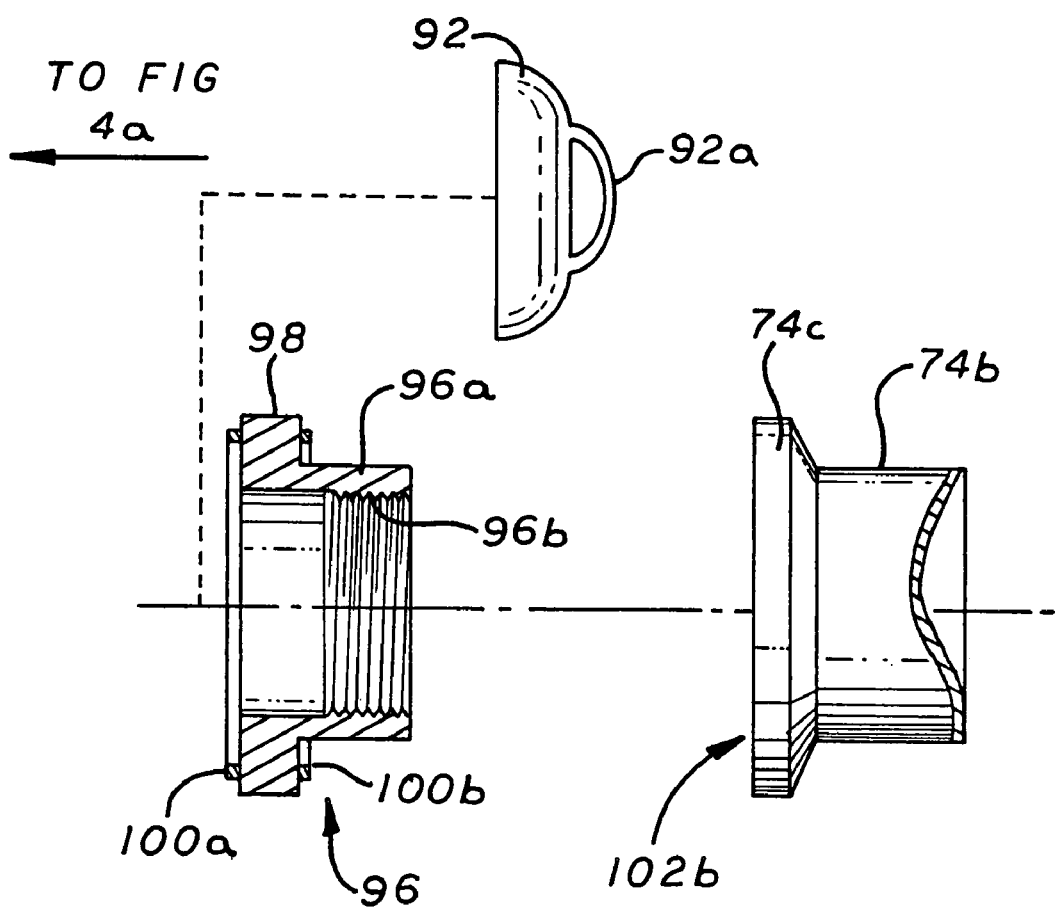

In the illustrated position of the tube member 78 seen in FIG. 4a, a gasket and retention member 96 may be attached sealingly to the termination portion 94 of the tube member 78. In this embodiment (although the invention is not so limited), the termination portion 94 is outwardly provided with a thread 94a and the gasket and retention member 96 is likewise inwardly provided at a collar part 96a thereof with a matching thread 96b. The gasket and termination member 96 is thus sealingly threaded onto the protruding termination portion 94 of the tube member 78. It will be noted that the gasket and termination member 96 is provided with a radially-extending gasket flange part 98, which is configured to sealingly interface with both the flange 70 of the elbow 66 and the flange 74c of the valve 74. Particularly, as is illustrated in FIG. 4b, the flange part 98 includes a pair of oppositely directed ribs 100a and 100b, which are configured to be sealingly received into matching grooves 102a and 102b provided on the flanges 70 and 74c.

Figure 3:
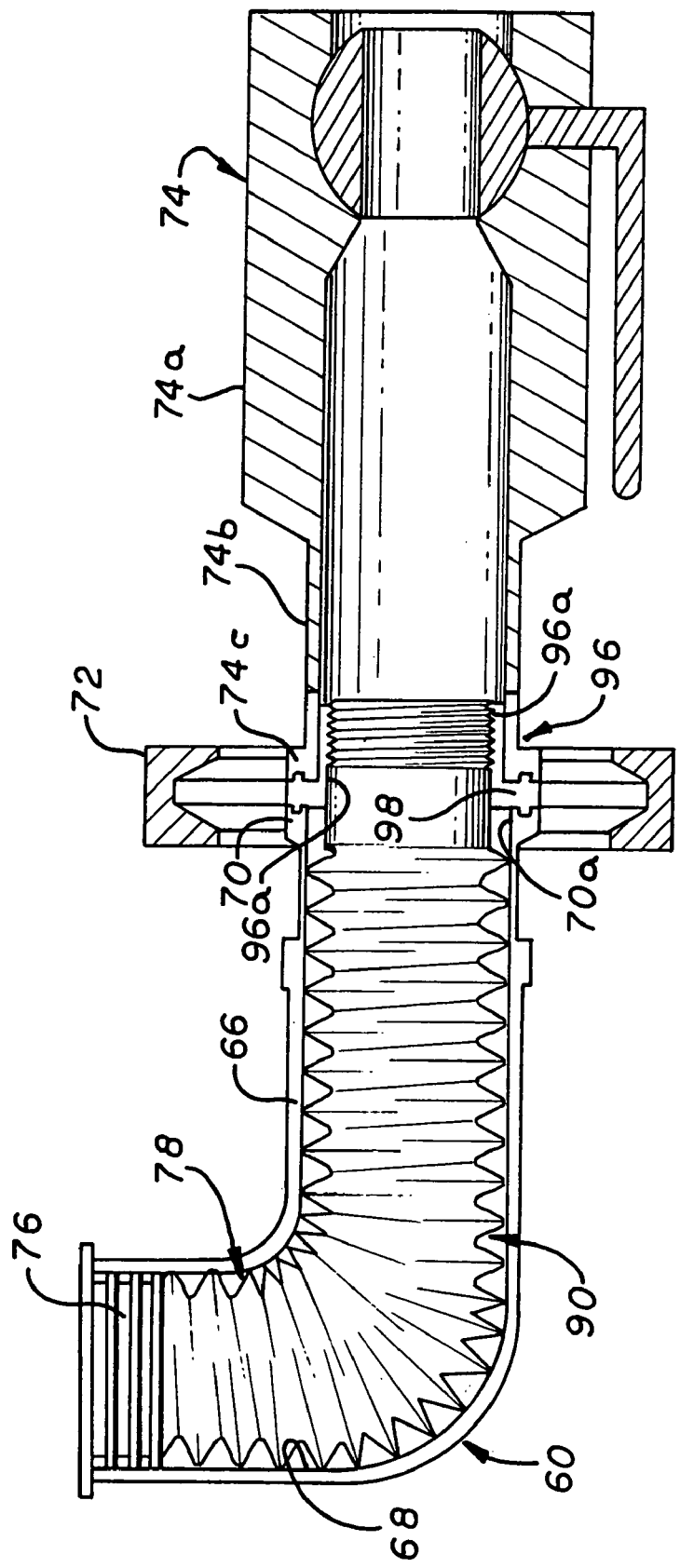
FIG. 3 is an enlarged side view in partial cross section of the discharge assembly of the container of FIG. 1.

In view of the above, it will be understood that after installation of the gasket and retention member 96 onto the end termination portion 94 of the tube member 78, the end termination portion 94 is pushed into the elbow through opening 70a at flange 70. This pushing of the end termination portion 94 of tube member 78 into the elbow results in a contraction of the corrugated section 90, and does not cause the fitting 76 to be dislodged from the nipple 62 (returning to consideration of FIG. 3). Next, the valve 74 is connected at its flange 74c to the flange 70 using band clamp 72. The collar portion 96a fits within the conduit portion 74b of valve 74, viewing FIG. 3.

In view of the above, it is seen that when liquid or semi-liquid contents (indicated on FIG. 2 with the character "C") are filled into the chamber 58 of the liner 40 (i.e., within the tank 12), the only parts of the tank that are wetted by these contents are the inside of the lid 34 and the valve 74. The inside of lid 34 may be protected easily be providing a disk of plastic film material across opening 30 and under this lid, to be held in place by the lid 34 and its band clamp. Thus, only the valve 74 may be wetted by the contents "C" of the tank 12. After the contents are stored or transported (or both) in the tank 12, and the tank is emptied via the discharge assembly 60 (i.e., by opening valve 74), only a small amount of the contents will remain in the liner 40. This is the case especially because precautions have been taken to insure that the fitting 76 is not dislodged upwardly from within the nipple 62 with the result that the liner 40 drains substantially completely of its contents.

Thus, when the tank 12 is to be prepared for its next use, the valve 74 is removed by releasing band clamp 72, the gasket and retention member 96 is removed from the tube member 78, the cap 92 may be placed once again on the tube member 78 (thus preventing any small remaining part of the contents of the liner 40 from spilling into via this tube into the inside of the tank 12 during removal of the liner from the tank opening 30); and the liner 40 is removed from within the tank 12 via opening 30. Because the liner 40 has drained substantially completely and the tube 78 is preferably closed by cap 92 during removal of the liner from within the tank, there is little chance of getting any of the remaining contents on the tank 12 itself, and there is also only a minimal amount of the former contents of the tank 12 to be dealt with and disposed of along with the liner 40. This minimal amount of the former contents of tank 12 and the liner 40 are then properly disposed of.

The valve 74 may be disassembled for cleaning, if necessarily. The inner surface of lid 34 is easily and quickly cleaned. However, in contrast to the conventional technology, there is no need to clean the inside of the tank 12 itself. Further, the present invention virtually eliminates any risk that a portion of the contents of the liner 40 can seep at the discharge assembly 60 into the space between the liner 40 and the tank 12 itself. Thus, a problem of the conventional technology is solved by the present invention.

Figure 5:
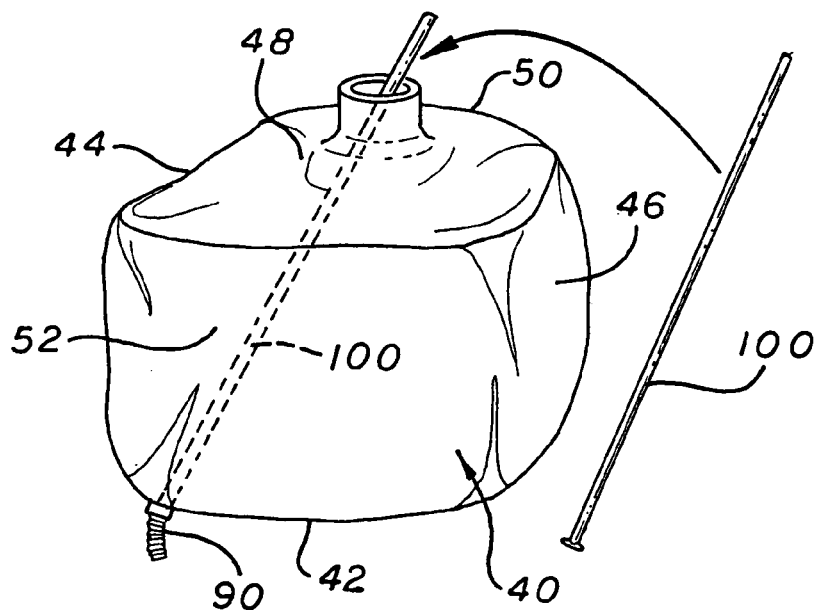
FIG. 5 is a perspective view illustrating a first step in a procedure of the present invention for installing a tank liner such as is illustrated in FIG. 2.
Figure 6:
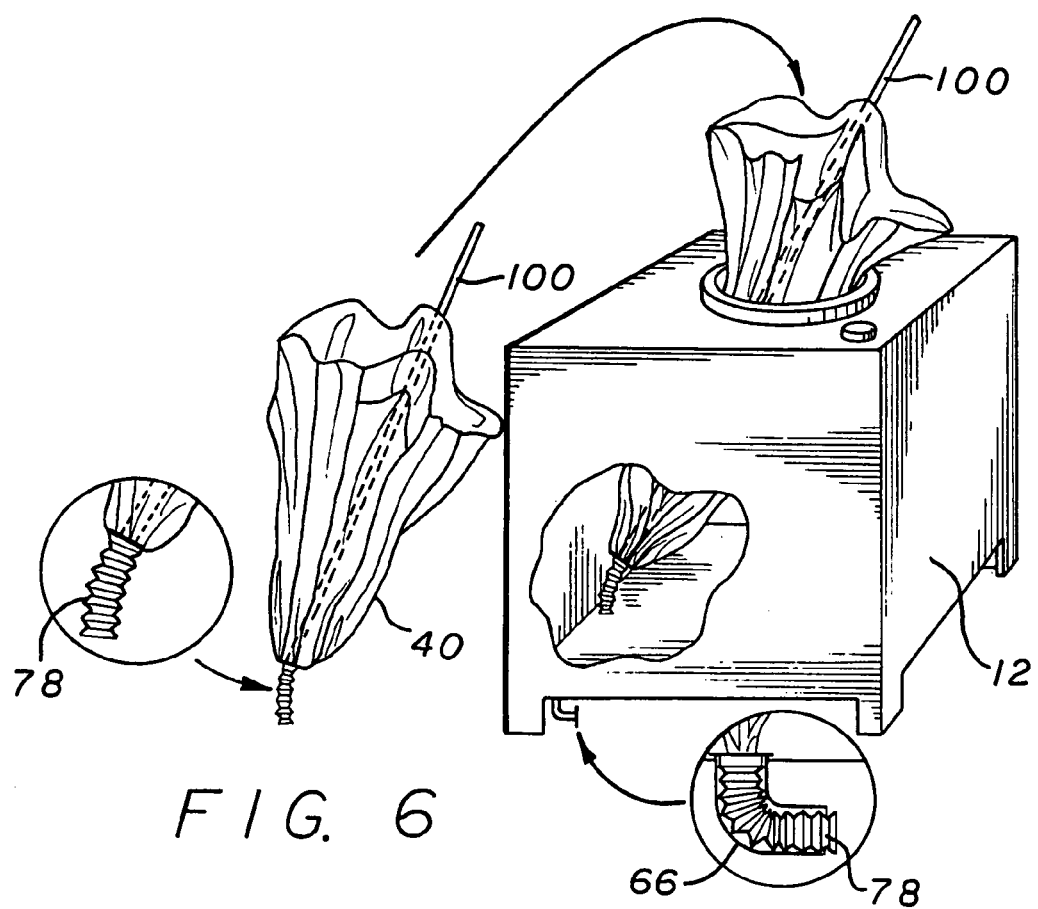
FIG. 6 is a perspective view of a second step with key components shown in enlarged view in circles.
Figure 7A:
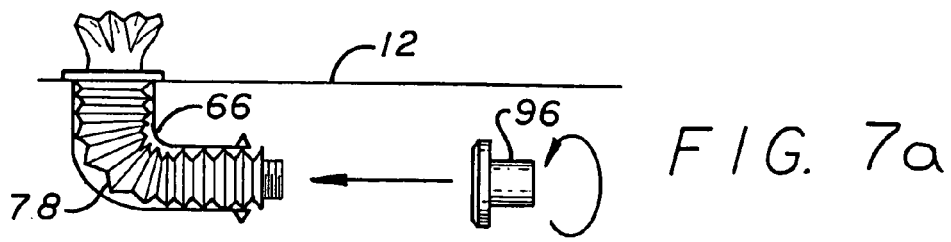
FIGS. 7a, b, c and d are side elevational views of sequential different substeps of a third step.
Figure 7B:
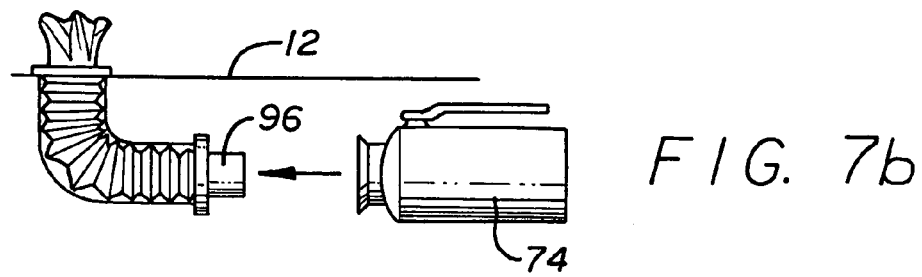
Figure 7C:
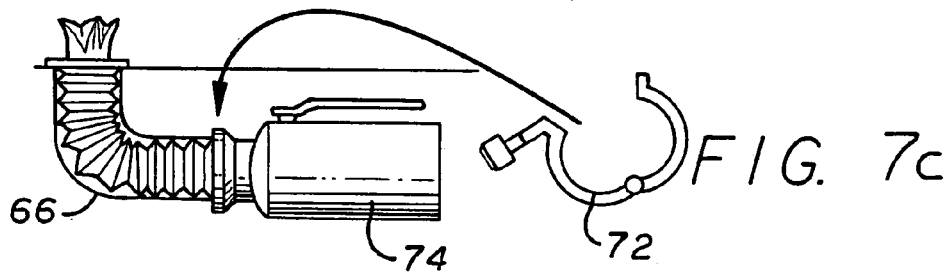
Figure 7D:
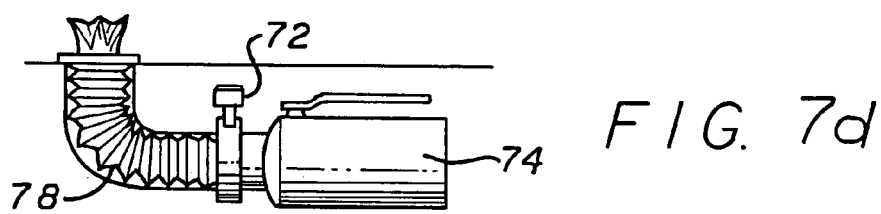
Figure 8:
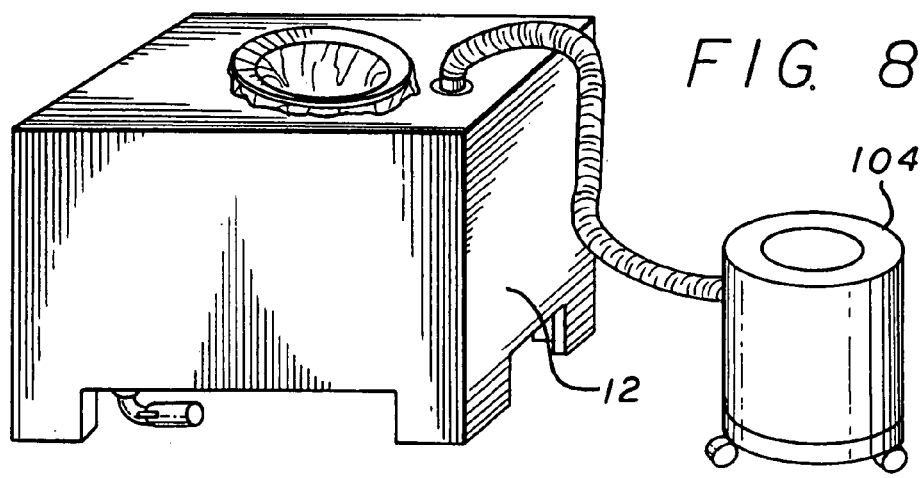
FIG. 8 is a perspective view of a fourth step.

A method of installing a tank liner according to the present invention will now be described with reference to FIGS. 5–8. FIG. 5 shows inserting a locator guide 100 into an opening in the top of the liner bag 40 and securing it in the bottom discharge fitment. Referring to FIG. 6, with the locator guide 100 in place, the bag 40 is collapsed and inserted into the tank 12, guiding the discharge assembly 90 into the bottom outlet 76 and making sure that the flexible tube 90 extends out of the elbow 68. The (left hand thread) gasket coupler 96 is screwed on, as shown in FIG. 7a. The discharge valve 74 is positioned on the coupler 96 (as by threading or simply sliding) as depicted in FIG. 7b. Referring to FIG. 7c, a tri-clamp 72 is then fitted on the flanges and into place as depicted in FIG. 7d. The top opening of the liner 40 is fitted around the manhole in the container 12. The two inch vent bung is removed and a vacuum using vacuum device 104 is applied to remove the air between the liner 40 and the tank 12. Once the liner is secured in place the vent bung is reinstalled, and the container is ready to be filled. And the lid is secured prior to shipping.

An improved spout or tube member is shown generally at 120 in FIGS. 9 and 10. It includes a corrugated flexible tube 124. The liner bag and the spout are separately formed and the spout flange is heat sealed to the bag. The assembly process is illustrated in FIGS. 5–8. The threaded neck 128 is provided at the discharge end of the spout 120, and is shown enlarged and in isolation in FIG. 11. A connector piece 132 connects the neck 128 to the flexible tube 124. A radial flange 138 is secured at the proximal end of the spout 120. The flange 138 is welded (or otherwise secured with a sealed fit) to the liner. The tube has a length of between approximately 3.4 and 5.4 inches and a diameter of approximately 1.0 to 1.5 inches.

FIGS. 12 and 13 show an improved gasket 150 with a gasket flange 154 with nibs 156, 158 and a threaded collar member 162. The nibs 156, 158 fit into respective gooves in the flanges of the elbow and the valve and elbow flange are held therein with a tight sealed fit by the clamp 72 as previously described.

From the foregoing detailed description, it will be evident that there are a number of changes, adaptations and modifications of the present invention which come within the province of those skilled in the art. However, it is intended that all such variations not departing from the spirit of the invention be considered as within the scope thereof.

What is claimed is:

1. A storage tank assembly, comprising:
   a tank;
   a flexible liner disposed in the tank and adapted to store product therein;
   a discharge assembly out through which product in the liner can be discharged;
   the discharge assembly including a discharge tube secured to the tank at a tank discharge opening;
   the discharge tube having an end flange;
   the discharge assembly including a tube member disposed in the discharge tube;
   a gasket assembly having a gasket flange; and
   a valve assembly having an assembly flange, the assembly flange being securable relative to the end flange with the gasket flange sandwiched therebetween, wherein the gasket assembly includes a collar which is engageable with the valve assembly, the collar includes male threads which thread into a female threaded opening of the valve assembly.

2. The assembly of claim 1 wherein the tube member includes a corrugated flexible tube member.

3. The assembly of claim 1 wherein the tube member is sealed to the flexible liner at a liner discharge opening.

4. The assembly of claim 3 wherein the tube member has a flange which is sealed to the flexible liner.

5. The assembly of claim 3 wherein the liner has a fitting and the tube member is securable to the fitting.

6. The assembly of claim 3 wherein the discharge tube comprises a rigid angled elbow.

7. The assembly of claim 3 wherein the gasket flange is secured with a rib-groove arrangement.

8. The assembly of claim 7 wherein the gasket flange includes first and second oppositely-disposed ribs, and with the gasket flange sandwiched between the assembly and gasket flanges, the first rib fitting into a groove in the assembly flange and the second rib fitting into a groove in the gasket flange.

9. The assembly of claim 1 further comprising a clamp which holds the assembly and end flanges together.

10. The assembly of claim 1 wherein the tunic includes a nipple at the tank opening and to which the discharge tube is secured.

11. The assembly of claim 10 wherein the discharge tube is threaded onto the nipple.

12. The assembly of claim 1 wherein the tube member extends out beyond the end flange.

13. A storage tank assembly, comprising:
    a tank having a nipple at an outlet opening;
    a flexible liner disposed in the tank and adapted to store product;
    an elbow adapted to be secured to the nipple;
    a flexible tube disposed in the elbow and secured to the flexible liner; and
    a gasket which threads onto a distal end of the flexible tube.

14. The assembly of claim 13 wherein the flexible tube is welded into the flexible liner.

15. The assembly of claim 13 wherein the flexible liner comprises a bag constructed of polyethylene film.

16. The assembly of claim 13 wherein the flexible tube includes an end flange which is secured to the flexible liner.

17. The assembly of claim 16 wherein the end flange has a flat circular disc shape with a central through-passageway.

18. The assembly of claim 13 wherein the liner includes a fitting, the fitting being adapted to be received in the outlet opening, and the tube being securable at a proximal end thereof to the fitting.

19. The assembly of claim 13 wherein the elbow includes an elbow flange, and further comprising a valve assembly have a valve flange and a gasket having a gasket flange, the gasket flange being clamped between the elbow flange and the valve flange.

20. The assembly of claim 19 wherein the flexible tube is secured to the gasket.

21. A storage tank assembly, comprising:
a tank;
a flexible liner disposed in the tank and adapted to store product therein;
a discharge assembly out through which product in the liner can be discharged;
the discharge assembly including a discharge tube secured to the tank at a tank discharge opening;
the discharge tube having an end flange;
the discharge assembly including a tube member disposed in the discharge tube;
a gasket assembly having a gasket flange;
a valve assembly having an assembly flange, the assembly flange being securable relative to the end flange with the gasket flange sandwiched therebetween; and
a clamp which holds the assembly and end flanges together.

22. The assembly of claim 21 wherein to tube member includes a corrugated flexible tube member.

23. The assembly of claim 21 wherein the tube member is sealed to flexible liner at a liner discharge opening.

24. The assembly of claim 23 wherein to tube member has a flange which is sealed to the flexible liner.

25. The assembly of claim 23 wherein the liner has a fitting and the tube member is securable to the fitting.

26. The assembly of claim 23 wherein the discharge tube comprises a rigid angled elbow.

27. The assembly of claim 23 wherein the gasket flange is secured with a rib-groove arrangement.

28. The assembly of claim 27 wherein the gasket flange includes first and second oppositely-disposed ribs, and with the gasket flange sandwiched between the assembly and gasket flanges, the first rib fitting into a groove in the assembly flange and the second rib fitting into a groove in the gasket flange.

29. The assembly of claim 21 wherein the gasket assembly includes a collar which is engageable with the valve assembly.

30. The assembly of claim 29 wherein the collar includes male threads which tread into a female threaded opening of the valve assembly.

31. The assembly of claim 21 wherein the tank includes a nipple at the tank opening and to which the discharge tube is secured.

32. The assembly of claim 31 wherein the discharge tube is threaded onto the nipple.

33. The assembly of claim 21 wherein to tube member extends out beyond the end flange.

34. A storage tank assembly, comprising:
a tank;
a flexible liner disposed in the tank and adapted to store product therein;
a discharge assembly out through which product in the liner can be discharged;
the discharge assembly including a discharge tube secured to the tank at a tank discharge opening;
the discharge tube having an end flange;
the discharge assembly including a tube member disposed in the discharge tube and sealed to the flexible liner at a liner discharge opening;
a gasket assembly having a gasket flange; and
a valve assembly having an assembly flange, the assembly flange being securable relative to the end flange with the gasket flange sandwiched therebetween, wherein the gasket flange is secured with a rib-groove arrangement.

35. The assembly of claim 34 wherein the tuba member includes a corrugated flexible tube member.

36. The assembly of claim 34 wherein the tube member is sealed to the flexible liner at a liner discharge opening.

37. The assembly of claim 36 wherein the tube member has a flange which is sealed to the flexible liner.

38. The assembly of claim 36 wherein the liner has a fitting and the tube member is securable to the fitting.

39. The assembly of claim 36 wherein the discharge tube comprises a rigid angled elbow.

40. The assembly of claim 34 wherein the gasket flange includes first and second oppositely-disposed ribs, and with the gasket flange sandwiched between the assembly and gasket flanges, the first rib fitting into a groove in the assembly flange and the second rib fitting into a groove in the gasket flange.

41. The assembly of claim 34 wherein the gasket assembly includes a collar which is engageable with the valve assembly.

42. The assembly of claim 41 wherein the collar includes male threads which thread into a female threaded opening of the valve assembly.

43. The assembly of claim 34 further comprising a clamp which holds the assembly and end flanges together.

44. The assembly of claim 34 wherein the tank includes a nipple at the tank opening and to which the discharge tube is secured.

45. The assembly of claim 44 wherein the discharge tube is threaded onto the nipple.

46. The assembly of claim 34 wherein the tube member extends out beyond the end flange.

* * * * *